US 8,192,314 B2

(12) United States Patent
Hüttinger et al.

(10) Patent No.: US 8,192,314 B2
(45) Date of Patent: Jun. 5, 2012

(54) PLATE FOR A ROCKER JOINT CHAIN

(75) Inventors: Johannes Hüttinger, Rosbach (DE); Olga Ispolatova, Bühl (DE); Wolfgang Oberle, Seelbach (DE); André Teubert, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 573 days.

(21) Appl. No.: 12/317,244

(22) Filed: Dec. 18, 2008

(65) Prior Publication Data

US 2009/0181817 A1    Jul. 16, 2009

Related U.S. Application Data

(60) Provisional application No. 61/008,023, filed on Dec. 18, 2007.

(51) Int. Cl.
*F16G 13/02* (2006.01)
(52) U.S. Cl. ........................................ 474/229
(58) Field of Classification Search .............. 474/201, 474/206, 213, 214, 215, 216, 228, 229, 230, 474/245
See application file for complete search history.

(56) References Cited

U.S. PATENT DOCUMENTS

| | | | | |
|---|---|---|---|---|
| 5,154,674 A | | 10/1992 | Avramidis et al. | 474/214 |
| 5,393,272 A | * | 2/1995 | Okuwaki et al. | 474/213 |
| 6,478,704 B1 | * | 11/2002 | Greiter | 474/215 |
| 6,558,281 B1 | * | 5/2003 | Greiter | 474/219 |
| 6,824,484 B2 | * | 11/2004 | Greiter | 474/201 |
| 7,357,742 B2 | * | 4/2008 | Wagner et al. | 474/215 |
| 2005/0202915 A1 | * | 9/2005 | Pichura et al. | 474/215 |
| 2005/0209035 A1 | * | 9/2005 | Oberle et al. | 474/215 |
| 2007/0149330 A1 | | 6/2007 | Junig et al. | 474/157 |
| 2007/0161446 A1 | * | 7/2007 | Penner | 474/215 |
| 2007/0275805 A1 | | 11/2007 | Hüttinger | 474/215 |
| 2007/0298922 A1 | * | 12/2007 | Triller et al. | 474/215 |
| 2008/0176692 A1 | * | 7/2008 | Teubert | 474/214 |

FOREIGN PATENT DOCUMENTS

| | | | |
|---|---|---|---|
| DE | 41 13 370 A1 | | 10/1991 |
| DE | 197 43 676 A1 | | 4/1998 |
| JP | 10122307 A | | 5/1998 |
| WO | WO 2007/065406 A1 | | 6/2007 |
| WO | WO 2007/128262 A1 | | 11/2007 |

* cited by examiner

*Primary Examiner* — William A Rivera
(74) *Attorney, Agent, or Firm* — Alfred J. Mangels

(57) ABSTRACT

A plate for a rocker joint chain, wherein the plate includes two longitudinal legs and two vertical legs that together surround a plate opening. The plate includes an indentation positioned on an outer edge of at least one of the longitudinal legs, and it includes at least one tab positioned on the outside contour of the plate. The plate configuration enables an easier determination to be made to ascertain a specified orientation of such plates within an assembled plate-link chain formed from a plurality of plates.

5 Claims, 2 Drawing Sheets

PLATE FOR A ROCKER JOINT CHAIN

BACKGROUND OF THE INVENTION

1. Field of the Invention

The present invention relates to a plate for a rocker joint chain, wherein the plate includes two longitudinal legs and two vertical legs that together surround a plate opening. In addition, the invention also relates to a plate-link chain having such plates, as well as to a method for checking a prescribed orientation of a plate in a plate-link chain.

2. Description of the Related Art

Plates for rocker joint chains are often not constructed symmetrically, so that they have to be properly oriented during assembly of the chain. Furthermore, known plates usually have one or more tabs on one longitudinal leg, with which they are arranged and installed in a prescribed orientation in the plate-link chain during assembly. In accordance with more recent efforts, such tabs on the longitudinal legs should be dispensed with insofar as possible, since they can lead to additional wear, for example in the case of guide rails provided for chain strand vibration reduction.

An object of the present invention is to provide a plate for a plate-link chain in which tabs on the longitudinal legs of the plate are eliminated, but in which the plate has a geometric feature that permits a conclusion to be made concerning the orientation of the plate, for example after it has been installed in a plate-link chain.

SUMMARY OF THE INVENTION

Briefly stated, in accordance with one aspect of the present invention, in a plate for a rocker joint chain, wherein the plate includes two longitudinal legs and two vertical legs which together surround a plate opening, an indentation is provided on at least one of the longitudinal legs and at least one tab is provided on the outer contour of the plate.

The tab is preferably situated in the region of the transition from a longitudinal leg to a vertical leg, and in such a way that when the plate is in the installed position in an extended plate-link chain the tab does not project beyond the surfaces of the plate-link chain. The tab position is such that when the plate-link chain contacts a guide plate or the like, for example, the tab does not come into contact with that plate.

The tab is preferably visible in the top view of the plate. A tab that is visible in the top view of the plate can be visually checked after the plate has been installed in a plate-link chain. That is done by using a computerized camera system, for example, with which the combination of indentation and tab is checked, so that it is possible to determine if the plate is installed in the plate-link chain in the correct orientation.

The indentation and the tab are preferably visible from at least one visual direction in a plane parallel to the plane of the plate. The plane of the plate refers here to the plane that runs parallel to the flat surfaces of the plate, i.e., a plane that is perpendicular to the rocker joint axes. Preferably, there is provision for the plate to include a plurality of indentations.

Furthermore, there can be provision for the plate to include at least one additional tab. The additional tab is preferably located on the same vertical leg as the other tab, but, alternatively, it can also be located on the other vertical leg. The additional tab is a stop tab, for example.

The object identified at the beginning is also achieved by a plate-link chain composed of plates in accordance with the present invention. The object identified at the beginning is also achieved by a method for testing a prescribed orientation of a plate in a plate-link chain, wherein the plate includes at least one indentation and at least one tab, and wherein the prescribed orientation can be detected when the indentation and the tab are visible.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
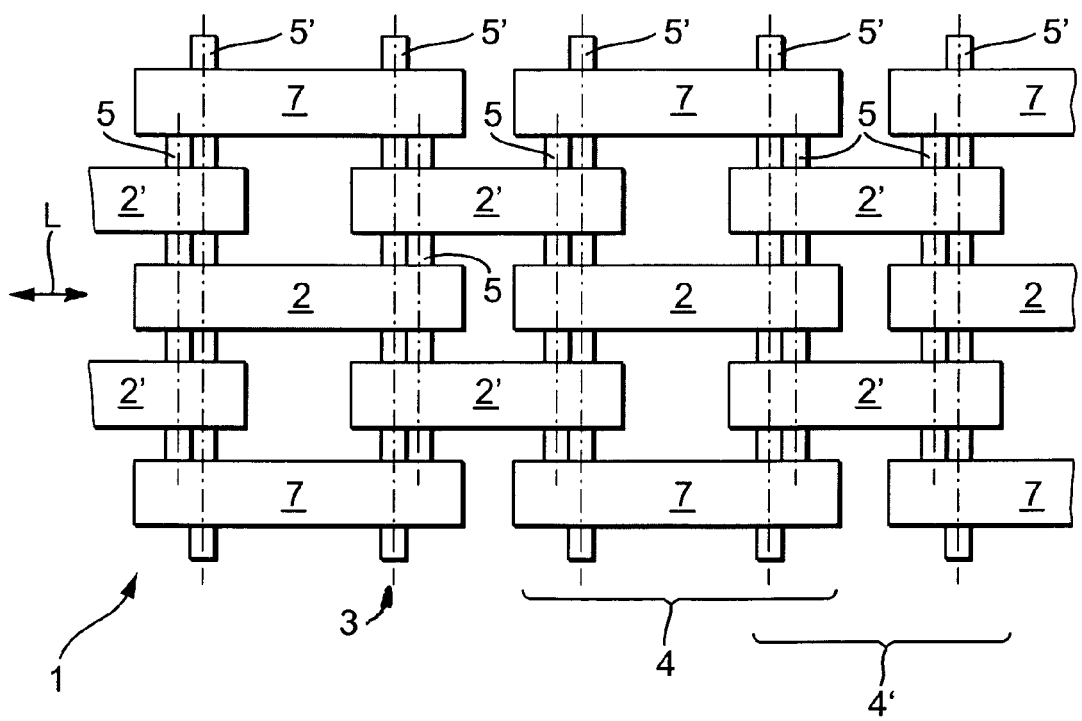
FIG. 1 is a top view of a portion of a plate-link chain.
Figure 2A:
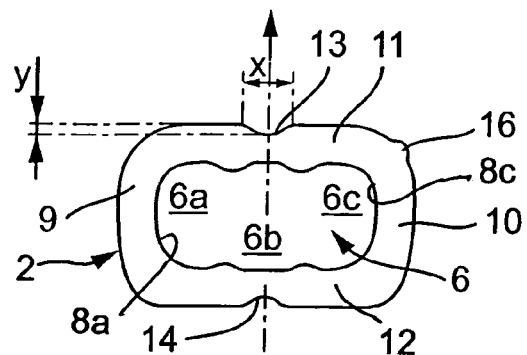
FIGS. 2a) through d) show exemplary embodiments of plates in accordance with the present invention.
Figure 2B:
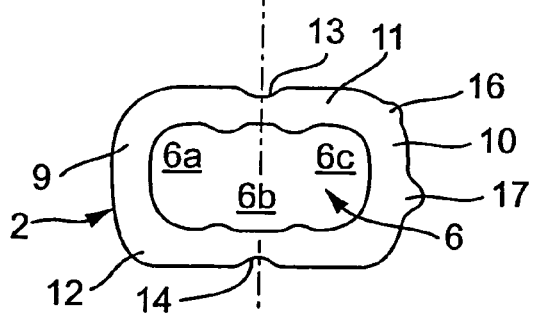
Figure 2C:
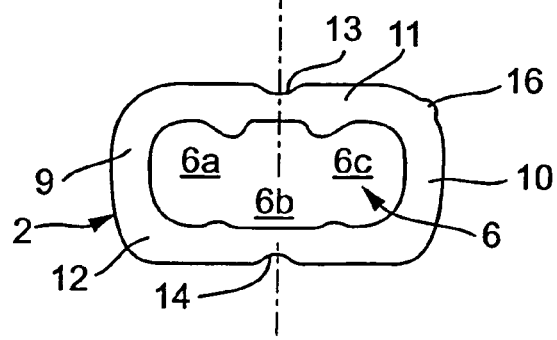
Figure 2D:
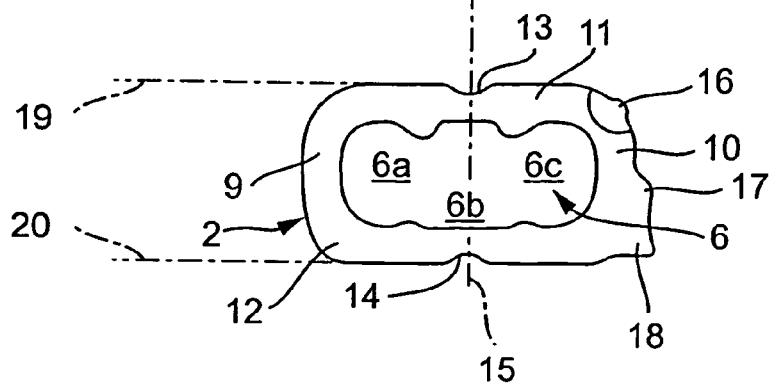

FIG. 1 shows a top view of a plate-link chain 1 having a two-plate connection. The basic construction of plate-link chains, and the terms used in the exemplary embodiments in accordance with the present invention, will be explained on the basis of FIG. 1.

FIG. 1 shows a plate-link chain 1 having two-plate connections, but plates in accordance with the invention are equally applicable to a plate-link chain having three-plate connections. Plate link chain 1 includes a plurality of plates 2 and opposed plates 2'. Plates 2 and opposed plates 2' are arranged alternately and are connected with hinge pins 3 as a hinge joint. Consequently, both ends of a plate are connected by means of a hinge to one or two opposed plates, and correspondingly both ends of an opposed plate are connected to one or two plates with a hinge.

The hinge pins 3 are in two parts, with a short rocker member 5 that is associated with each of the plates 2 and that rolls against a long rocker member 5' associated with one of the opposed plates 2'. In addition, rocker members 5, 5' each have a rolling profile, with which they can roll or slide on each other. The rolling profiles can be identical or different. The plates 2 and opposed plates 2' are stacked transversely to the chain running direction L, which is identified by a double arrow with the reference label L, so that an overlapping opposed plate is situated between two hinge pins 3 that are situated side-by-side perpendicular to the running direction L, and conversely, a plate is situated between and overlaps two opposed plates that are located side-by-side transversely relative to the running direction. The plate sets 4 of plates 2 formed in that way constitute a chain link by sets, and correspondingly, the opposed plate sets 4' of opposed plates 2' constitute a chain link by sets.

In the present exemplary embodiment the plates 2 and opposed plates 2' are identical parts; a differentiation between plates 2 and opposed plates 2' exists only in the arrangement. Therefore, only plates 2 will be referred to below, because they are identical to the opposed plates except for the arrangement in various plate sets (chain links). Both sides of the plate-link chain are provided with cover plates 7. The cover plates are situated here only on the chain links 4, so that only every second chain link has cover plates 7. The cover plates 7 are firmly joined in each case to the rocker members 5'. To that end, the rocker members are passed through receiving openings in the cover plates (not described here) and have a press fit; that is, they are pressed to the cover plates. While the plates 2, which like the cover plates 7 belong to a chain link 4, are joined with the rocker members 5, or bear against them, the cover plates are firmly pressed with the rocker members 5' of the adjacent chain links 4'. The rocker members 5 do not extend through the cover plates 7. FIG. 1 shows a set of one plate 2 as well as one cover plate 7 on each of the two outer sides, and a set of two opposed plates 2'; however, sets with any other desired number of plates 2 and opposed plates 2' can also be provided.

FIGS. 2a through 2d show exemplary embodiments of plates 2 in accordance with the present invention. The plates 2 are substantially flat plates in which a plate opening 6 is formed. The plate opening 6 includes three regions, namely a region 6a for receiving a hinge pin and a region 6c for receiving another hinge pin. Situated between those regions is a region 6b, which remains as free space when the plate-link chain is in its installed position. Region 6a of plate opening 6 has a contact surface 8a, and, correspondingly, region 6c of plate opening 6 has a contact surface 8c. Contact surfaces 8a, 8c serve to support or attach the rocker members 5 or 5'.

The plates 2 include two vertical legs 9 and 10 and two longitudinal legs 11 and 12. The vertical and longitudinal legs are not individual parts, but are each regions of the plate 2 that are given individual identities only for the purpose of identifying those regions. Indentations 13 and 14 are made in the two longitudinal legs 11, 12. The indentations 13, 14 can have different depths y, different widths x, and different contours, but they can also have the same depths, widths, and contours. In the exemplary embodiments of FIGS. 2a through 2d the indentations 13 and 14 are all centered relative to a central axis 15. However, a plurality of indentations 13 or 14 can also be made in the longitudinal legs 11 or 12, or the indentations 13 or 14 are not centered relative to the central axis 15 but are offset relative to it.

The plates 2 each have a tab 16, which is located in the region of the transition from the vertical leg 10 to the longitudinal leg 11. Tab 16 is located there so that it does not extend beyond a straight line 19 (see FIG. 2d), which is one of two parallel enveloping straight lines 19 and 20 that bound the respective outer surfaces of longitudinal legs 11 and 12 of plate 2. Hence, the effect is that if plate 2 is laid with longitudinal leg 11 on a flat surface, tab 16 does not contact that surface. Additionally, tab 16 is positioned in such a way that it does not touch each adjacent plate 2 when plate-link chain 1 is bent about a transverse axis. In addition, tab 16 is positioned so that it is visible from the outside when plate-link chain 1 is installed. Those conditions are fulfilled when tab 16 is situated in the region of the transition from the vertical leg 10 to the longitudinal leg 11. It is likewise possible to situate tab 16 in any other convenient transition from a vertical leg to a longitudinal leg. Tab 16 is visible in a top view of plate 2; in particular, it is visible when plate 2 is installed in plate-link chain 1. In addition, plate 2 can also include additional tabs 17, as in the exemplary embodiments of FIGS. 2b and 2d, and it can have a stop tab 18, as in the exemplary embodiment of FIG. 2d, which limits the bending angle of plate-link chain 1.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A plate for a rocker joint chain, said plate comprising: two spaced, substantially parallel longitudinal legs that include an outer longitudinal leg and an inner longitudinal leg and wherein the inner longitudinal leg is closer to a chain bending axis than is the outer longitudinal leg, and two vertical legs that together with the longitudinal legs enclose a plate opening, wherein an indentation is positioned on an outer edge of at least one of the longitudinal legs, and a plate orientation tab is positioned on an outside contour of the plate in a region of a transition from the outer longitudinal leg to a vertical leg for orienting the plate relative to other plates that together form a chain; wherein the orientation tab lies within a pair of imaginary parallel lines that extend along outer edges of the longitudinal legs of the plate; and a stop tab positioned at a region of transition from the inner longitudinal leg to a vertical leg for limiting a bending angle of a chain containing the plate.

2. A plate in accordance with claim 1, wherein the orientation tab is visible in a top view of a plate.

3. A plate in accordance with claim 2, wherein the indentation and the orientation tab are visible in at least one visual direction in a plane parallel to a plate plane.

4. A plate in accordance with claim 1, wherein the orientation tab and the stop tab are positioned on the same vertical leg of the plate.

5. A plate-link chain comprising a plurality of plates in accordance with claim 1.

* * * * *